(12) United States Patent
Fukawa

(10) Patent No.: US 12,252,082 B2
(45) Date of Patent: Mar. 18, 2025

(54) IN-VEHICLE COMPONENT PROTECTION STRUCTURE

(71) Applicant: TOYOTA JIDOSHA KABUSHIKI KAISHA, Toyota (JP)

(72) Inventor: Yukihiro Fukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/489,281

(22) Filed: Oct. 18, 2023

(65) Prior Publication Data
US 2024/0198933 A1 Jun. 20, 2024

(30) Foreign Application Priority Data
Dec. 14, 2022 (JP) .................. 2022-199553

(51) Int. Cl.
*B60R 16/03* (2006.01)
(52) U.S. Cl.
CPC .................. *B60R 16/03* (2013.01)
(58) Field of Classification Search
CPC .... B60R 16/03; F02M 39/02; F02M 2200/02; F02M 2200/18; F02M 2200/185; F02M 2200/26
See application file for complete search history.

(56) References Cited

U.S. PATENT DOCUMENTS

| 10,807,546 B2 * | 10/2020 | Sasaki | H01B 7/0045 |
| 2013/0033048 A1 * | 2/2013 | Oyama | B62D 25/082 |
| | | | 293/155 |

FOREIGN PATENT DOCUMENTS

| JP | 2013-174199 A | 9/2013 |
| JP | 2017-8769 A | 1/2017 |
| JP | 2019038412 A * | 3/2019 |
| JP | 2023107098 A * | 8/2023 |

OTHER PUBLICATIONS

Description translation for JP 2013174199 from Espacenet (Year: 2013).*
Description Translation for JP 2023107098 from Espacenet (Year: 2023).*
Description Translation for JP 2019/038412 from Espacenet (Year: 2019).*

* cited by examiner

*Primary Examiner* — Jason D Shanske
*Assistant Examiner* — Daniel M. Keck
(74) *Attorney, Agent, or Firm* — Oblon, McClelland, Maier & Neustadt, L.L.P.

(57) ABSTRACT

An in-vehicle component protection structure includes a first in-vehicle component, a second in-vehicle component that is an object to be protected from collision with the first in-vehicle component, and a protector disposed between the first in-vehicle component and the second in-vehicle component so as to face the first in-vehicle component. When the first in-vehicle component collides with the protector, the protector allows the first in-vehicle component to slide on the protector such that a moving direction of the first in-vehicle component deflects from the second in-vehicle component.

3 Claims, 5 Drawing Sheets

IN-VEHICLE COMPONENT PROTECTION STRUCTURE

CROSS-REFERENCE TO RELATED APPLICATION

This application is based upon and claims the benefit of priority of the prior Japanese Patent Application No. 2022-199553, filed on Dec. 14, 2022, the entire contents of which are incorporated herein by reference.

TECHNICAL FIELD

The present disclosure relates to an in-vehicle component protection structure.

BACKGROUND

Regarding a protection structure for a in-vehicle component, for example, in Japanese Unexamined Patent Application Publication No. 2017-008769, a fuel supply system component attached to a head cover of an engine is covered with a protector, and an end portion of the protector is brought into contact with a thick portion of the head cover. As a result, the collision load is supported and the fuel supply system component is protected.

However, when the end portion of the protector comes into contact with the thick portion of the head cover, an impact might be applied to the engine, so that an impact might also be applied to the fuel supply system component on the head cover.

SUMMARY

It is therefore an object of the present disclosure to provide an in-vehicle component protection structure capable of appropriately protecting the in-vehicle component from a collision.

The above object is achieved by an in-vehicle component protection structure including: a first in-vehicle component; a second in-vehicle component that is an object to be protected from collision with the first in-vehicle component; and a protector disposed between the first in-vehicle component and the second in-vehicle component so as to face the first in-vehicle component, wherein when the first in-vehicle component collides with the protector, the protector allows the first in-vehicle component to slide on the protector such that a moving direction of the first in-vehicle component deflects from the second in-vehicle component.

The second in-vehicle component may be fixed to a fixing portion, and the protector may be fastened to the fixing portion along a direction in which the protector faces the first in-vehicle component.

A support member disposed between the protector and the second in-vehicle component may be included, and the support member may support the protector in collision with the first in-vehicle component.

The protector may include: a contact surface with which the first in-vehicle component comes into contact; and a back surface opposite to the contact surface, and the support member is disposed at a distance from the back surface.

The first in-vehicle component may be a power control unit, and the second in-vehicle component may be a fuel pump.

DETAILED DESCRIPTION

Figure 1:
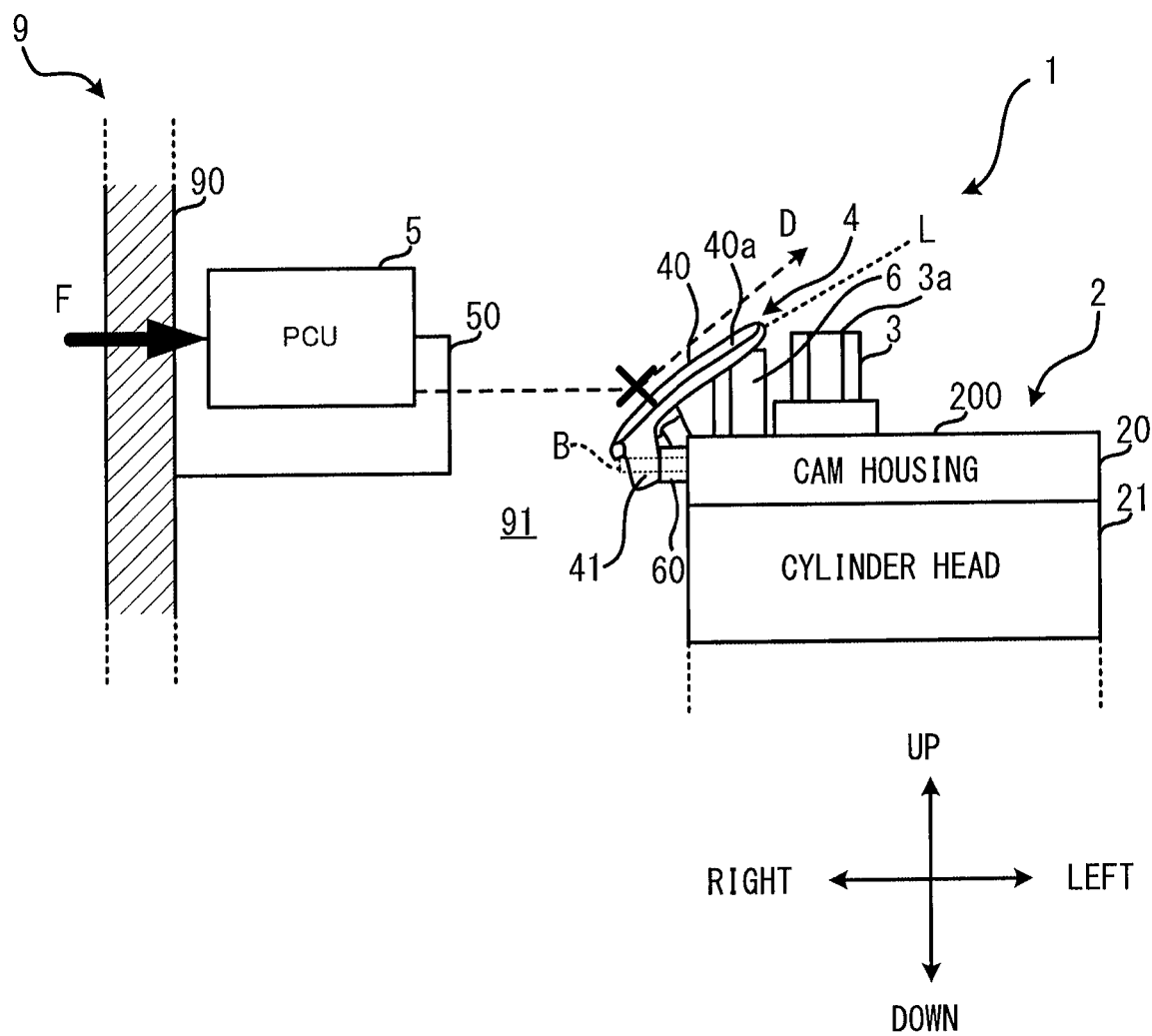
FIG. 1 is a side view illustrating an example of a protection structure for a fuel pump.
Figure 2:
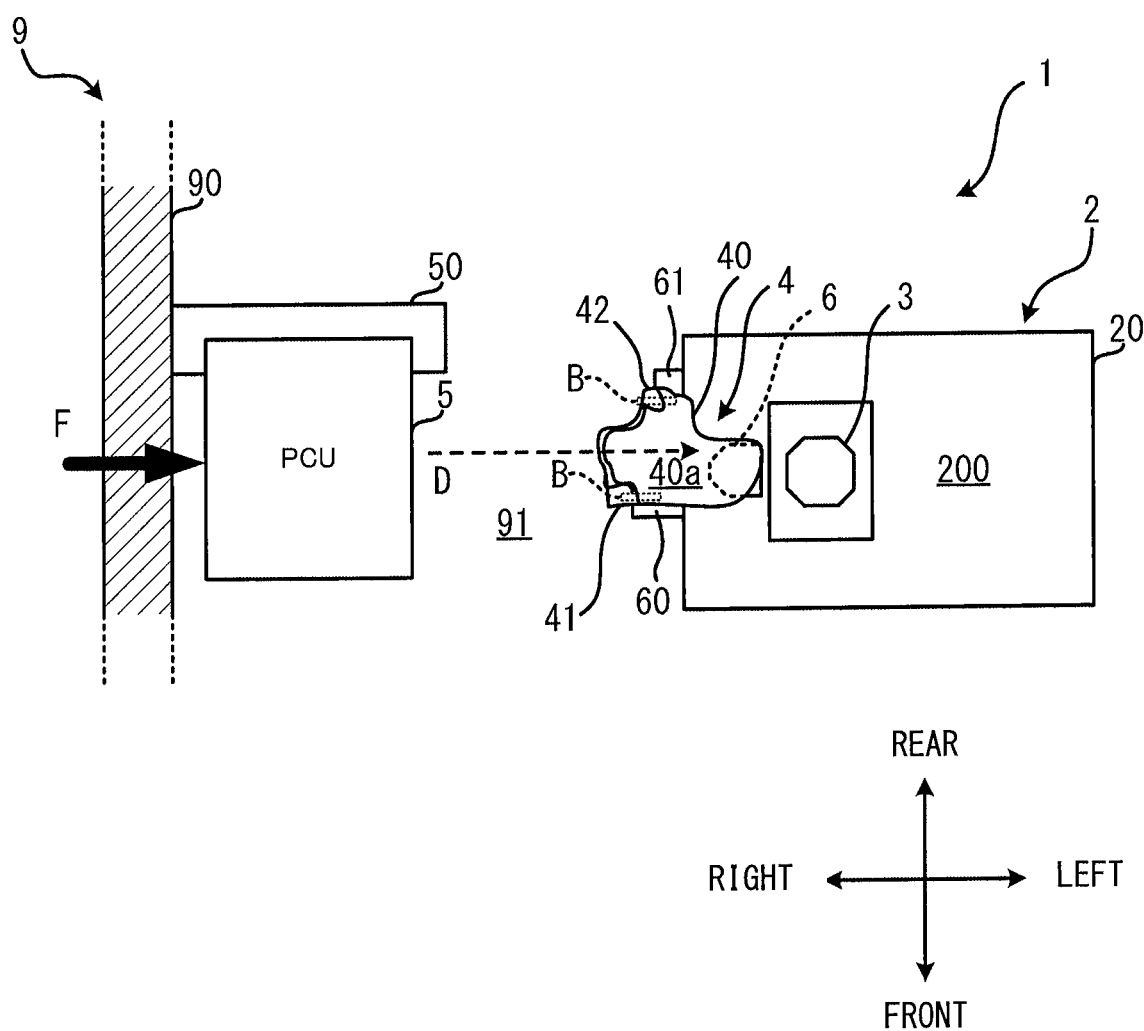
FIG. 2 is a top view illustrating an example of a protection structure for the fuel pump.

FIG. 1 is a side view illustrating an example of a protection structure 1 for a fuel pump 3. FIG. 2 is a top view illustrating an example of the protection structure 1 for the fuel pump 3. The protection structure 1 is provided, for example, inside a front compartment 91 in front of a hybrid vehicle 9. The front compartment 91 accommodates a Power Control Unit (PCU) 5, an engine 2, the fuel pump 3, and a protector 4. In FIGS. 1 and 2, a left-right direction, a up-down direction, and a front-rear direction of the hybrid vehicle are indicated by arrows.

The PCU 5 accommodates a converter circuit and an invertor circuit for controlling an electric system of the hybrid vehicle 9. The PCU 5 is attached to a vehicle body 90 via a bracket 50. The engine 2 includes a cam housing 20, a cylinder head 21, and the like. The fuel pump 3 is provided on an upper surface 200 of the cam housing 20. The cam housing 20 is an example of a fixing portion that fixes the fuel pump 3. In FIGS. 1 and 2, the PCU 5, the fuel pump 3, and the engine 2 are schematically illustrated. Here, the PCU 5 and the engine 2 have a substantially rectangular parallelepiped shape, and the fuel pump 3 has a substantially prismatic shape.

The PCU 5 and the fuel pump 3 are arranged side by side in the left-right direction. Therefore, for example, when the hybrid vehicle 9 is subjected to a right-side collision, the PCU 5 receives a collision load F from the right side and moves toward the fuel pump 3 disposed on the left side of the PCU 5 due to breakage of the bracket 50. When the PCU 5 collides with the fuel pump 3, the fuel pump 3 might be damaged.

Therefore, on the upper surface of the cam housing 20, the protector 4 is disposed between the PCU 5 and the fuel pump 3 so as to face the PCU 5. The protector 4 allows the PCU 5 to slide thereon such that the moving direction D of the PCU 5 is deflected from the fuel pump 3. Therefore, the collision between the fuel pump 3 and the PCU 5 is avoided while suppressing the impact on the engine 2. The PCU 5 is an example of a first in-vehicle component, and the fuel pump 3 is an example of a second in-vehicle component that is an object to be protected from collision with the PCU 5.

Figure 3:
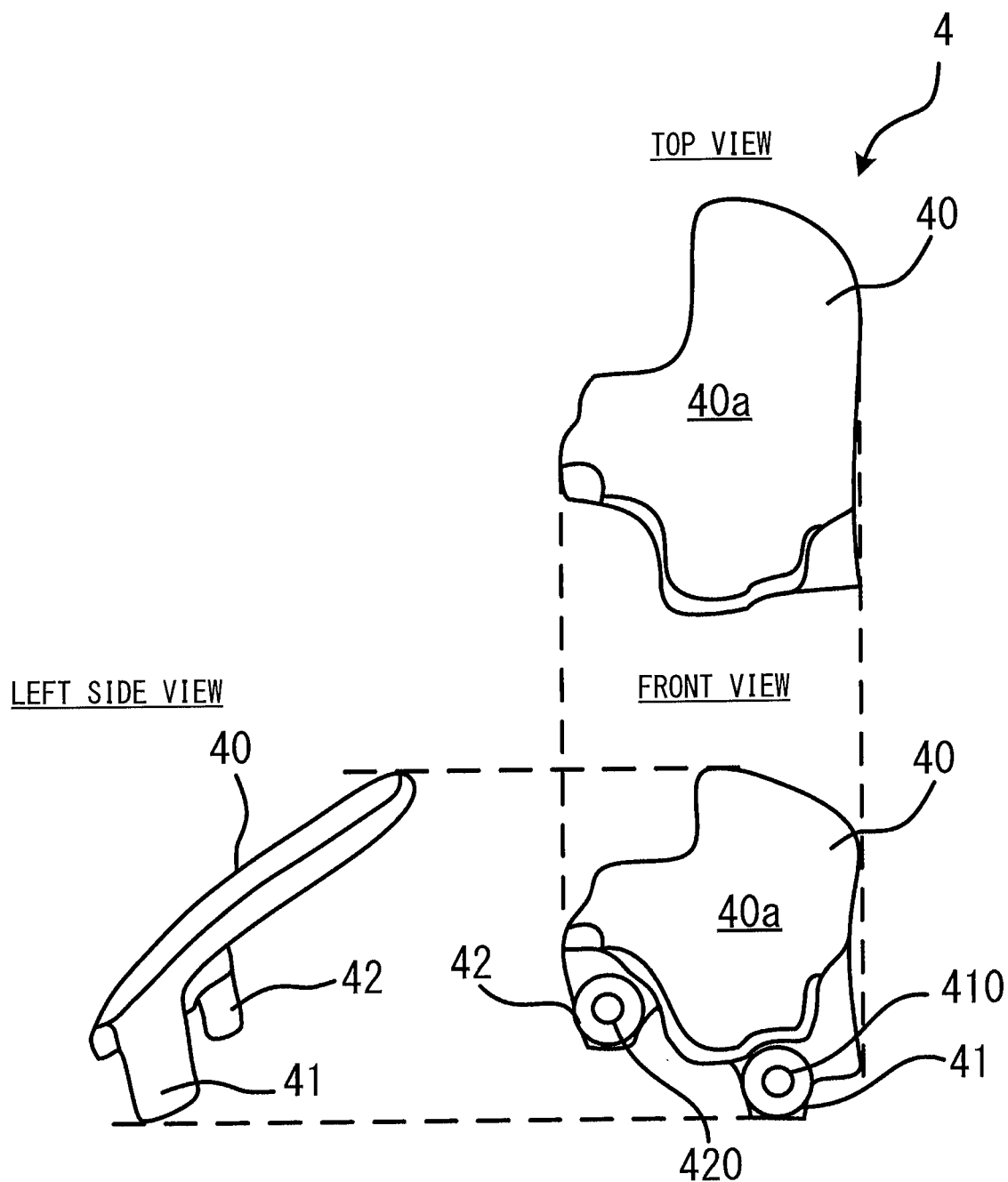
FIG. 3 is a view illustrating an example of a protector.

FIG. 3 is a view illustrating an example of the protector 4. FIG. 3 illustrates an upper view, a front view, and a left side view of the protector 4. The protector 4 is made of a metal having sufficient strength such as cast iron, but is not limited thereto.

The protector 4 includes a receiving portion 40 having a plate shape, and a pair of fastening portions 41 and 42. The pair of fastening portions 41 and 42 protrude downward from left and right end portions on the front side of the receiving portion 40, respectively. The fastening portions 41 and 42 are provided with holes 410 and 420 through which bolts are passed, respectively. The receiving portion 40 includes an inclined surface 40a whose inclination angle becomes gentle from the lower side to the upper side. Further, the inclined surface 40a is gently inclined from the center toward both ends in the left-right direction. Further, surface roughness (Ra) of the inclined surface 40a is adjusted such that the PCU 5 easily slides thereon.

As illustrated in FIGS. 1 and 2, the fastening portions 41 and 42 of the protector 4 are fastened to the cam housing 20 by bolts B via protector brackets 60 and 61, respectively. The protector brackets 60 and 61 are metal members fixed to the front end portion of the cam housing 20. The fastening direction of the bolt B is along the left-right direction in which the PCU 5 and the protector 4 face each other. For this reason, the protector 4 is suppressed from being detached from the cam housing 20 due to an impact, when the PCU 5 collides with the protector 4 (see a mark x).

The protector 4 is fixed such that the receiving portion 40 faces the PCU 5. Therefore, when the PCU 5 moves toward the fuel pump 3 due to a collision load F, the inclined surface 40a collides with the PCU 5 in the left-right direction. A moving direction D of the PCU 5 is changed into an obliquely upward direction along the inclined surface 40a so as to deflect from the collision course with the fuel pump 3.

The fuel pump 3 is disposed in a shadow of the inclined surface 40a when viewed from the PCU 5. In the up-down direction, an upper surface 3a of the fuel pump 3 is positioned below an extension line L extending along the inclined surface 40a. Therefore, even if the PCU 5 changes the moving direction D along the inclined surface 40a, the possibility that the PCU 5 comes into contact with the fuel pump 3 is reduced. The extension line Lis, for example, a tangential line at the upper end of the inclined surface 40a.

A support member 6 is disposed between the protector 4 and the fuel pump 3 in the left-right direction. The support member 6 supports the protector 4 by coming into contact with the protector 4 which is bent when the protector 4 and the PCU 5 collide with each other. Therefore, breakage of the protector 4 and contact between the fuel pump 3 and the protector 4 are suppressed.

Figure 4:
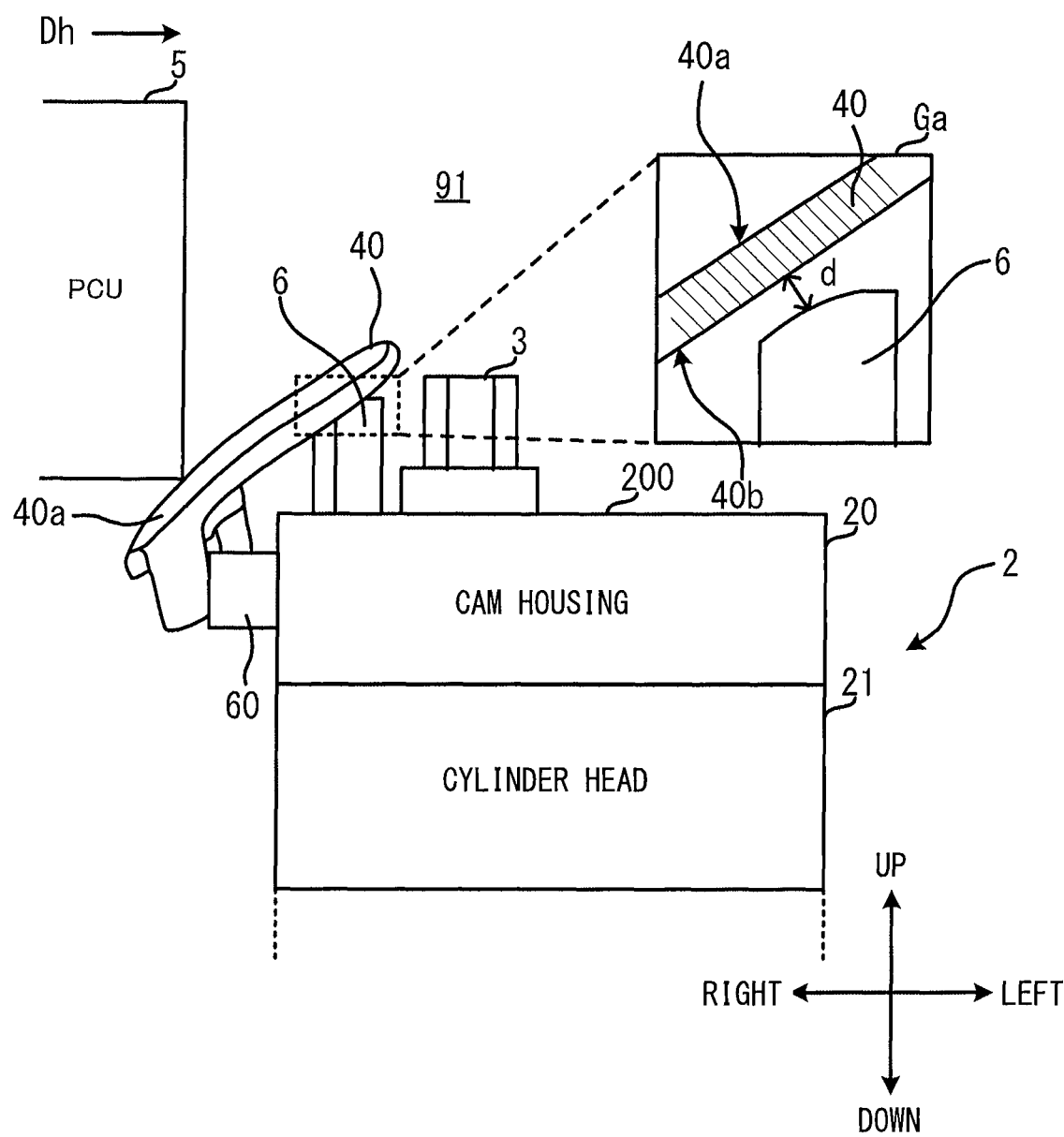
FIG. 4 is a side view illustrating the protector and a support member when the protector collides with a Power Control Unit (PCU)

FIG. 4 is a side view illustrating the protector 4 and the support member 6 when the protector 4 collides with the PCU 5. In FIG. 4, the same components as those in FIG. 1 are denoted by the same reference numerals, and description thereof is omitted. In addition, in FIG. 4, a symbol Ga indicates a cross-section of the receiving portion 40 and an enlarged view of the support member 6 at the center in the left-right direction within a dotted line frame.

The PCU 5 moves toward the fuel pump 3 as indicated by a symbol Dh and collides with the inclined surface 40a of the receiving portion 40 of the protector 4. In the present embodiment, before changing the moving direction of the PCU 5, a lower portion of the PCU 5 first contacts the inclined surface 40a. Immediately after the collision, the receiving portion 40 is not substantially bent. The inclined surface 40a is an example of a contact surface of the protector 4 that comes into contact with the PCU 5.

The support member 6 is disposed at a distance d from a back surface 40b opposite to the inclined surface 40a. The distance d is, for example, the shortest distance between the back surface 40b and the support member 6.

Figure 5:
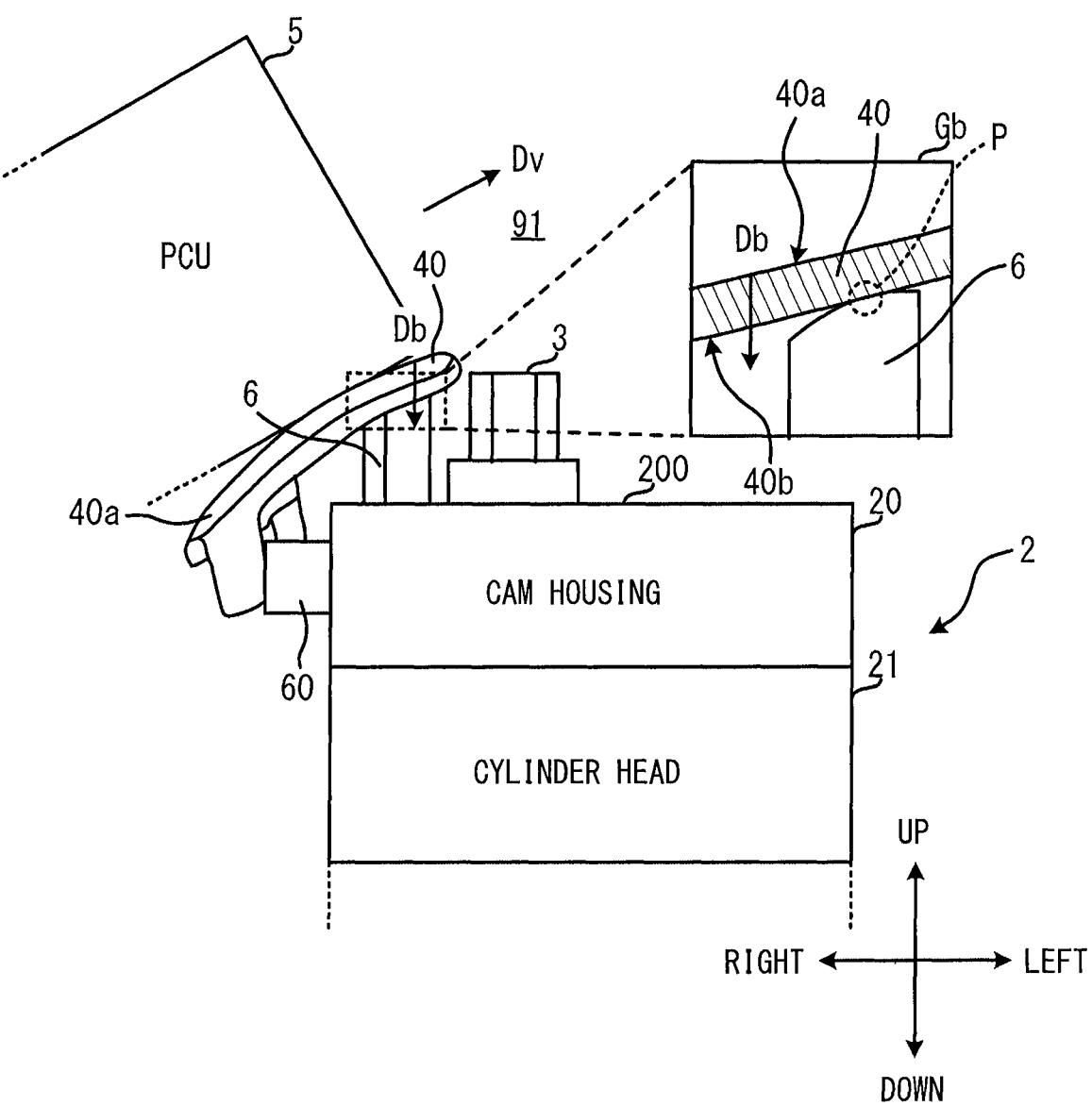
FIG. 5 is a side view illustrating the protector and the support member when the PCU slides on an inclined surface.

FIG. 5 is a side view illustrating the protector 4 and the support member 6 when the PCU 5 slides on the inclined surface 40a. In FIG. 5, the same components as those in FIG. 1 are denoted by the same reference numerals, and description thereof is omitted. In addition, in FIG. 5, a symbol Gb indicates a cross-section of the receiving portion 40 and an enlarged view of the support member 6 at the center in the left-right direction within a dotted line frame.

The PCU 5 slides on the inclined surface 40a with its bottom surface in contact with the inclined surface 40a, as indicated by a symbol Dv. Thus, the collision between the fuel pump 3 and the PCU 5 is avoided.

The upper end of the receiving portion 40 is bent downward by the load received from the sliding PCU 5, as indicated by a symbol Db. For this reason, the back surface 40b of the receiving portion 40 comes into contact with the support member 6 as indicated by a symbol P. At this time, the support member 6 supports the receiving portion 40 from the back surface 40b. Therefore, breakage of the protector 4 and contact between the fuel pump 3 and the protector 4 are suppressed.

The support member 6 is disposed at a distance d from the back surface 40b of the protector 4. For this reason, the influence of the size error at the time of assembling the support member 6 and the protector 4 is reduced. If the support member 6 is disposed in direct contact with the back surface 40b of the protector 4 without being disposed at the distance de from the back surface 40b, for example, the angle of the inclined surface 40a might deflect from a desired angle due to size errors. However, when the distance d is ensured in the present embodiment, the error of the size is absorbed by the distance d. Therefore, assembly is facilitated.

As described above, in the protection structure 1 according to the present embodiment, the fuel pump 3 is appropriately protected from collision. In the present embodiment, the fuel pump 3 is exemplified as an object to be protected by the protection structure 1, but the object to be protected is not limited thereto. For example, another in-vehicle component related to fuel supply such as a fuel tank or another in-vehicle component related to power supply such as a battery may be a protection object. Further, in the present embodiment, the PCU 5 is exemplified as a collision object with respect to the fuel pump 3, but the collision object is not limited to this, and other in-vehicle components may be the collision object.

Although some embodiments of the present disclosure have been described in detail, the present disclosure is not limited to the specific embodiments but may be varied or changed within the scope of the present disclosure as claimed.

What is claimed is:

1. An in-vehicle component protection structure comprising:
   a first in-vehicle component;
   a second in-vehicle component that is an object to be protected from collision with the first in-vehicle component;
   a protector disposed between the first in-vehicle component and the second in-vehicle component so as to face the first in-vehicle component; and
   a support member disposed between the protector and the second in-vehicle component, supporting the protector in collision with the first in-vehicle component, wherein
   the protector has an inclined surface obliquely disposed against an opposing direction in which the first in-vehicle component and the second in-vehicle component are opposing to each other,
   when the first in-vehicle component collides with the protector along the opposing direction, the protector allows the first in-vehicle component to slide on the inclined surface such that a moving direction of the first in-vehicle component deflects from the second in-vehicle component, and
   the support member is disposed at a distance from a back surface of the inclined surface of the protector.

2. The in-vehicle component protection structure according to claim 1, wherein
the second in-vehicle component is fixed to a fixing portion, and
the protector is fastened to the fixing portion along a direction in which the protector faces the first in-vehicle component.

3. The in-vehicle component protection structure according to claim 1, wherein
the first in-vehicle component is a power control unit, and
the second in-vehicle component is a fuel pump.

\* \* \* \* \*